Oct. 30, 1962  P. A. ANDREASSON  3,060,983
STRETCH DEVICES
Filed June 1, 1961
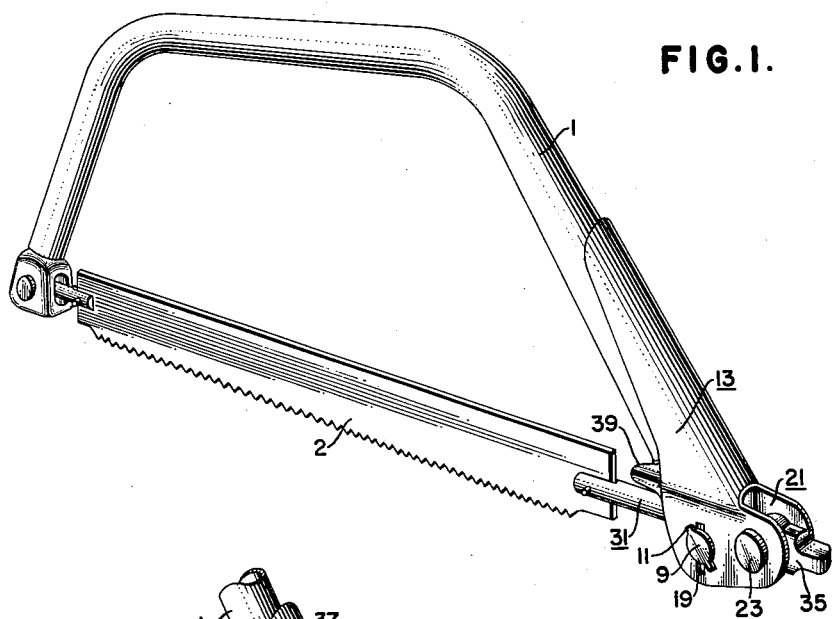
FIG.I.
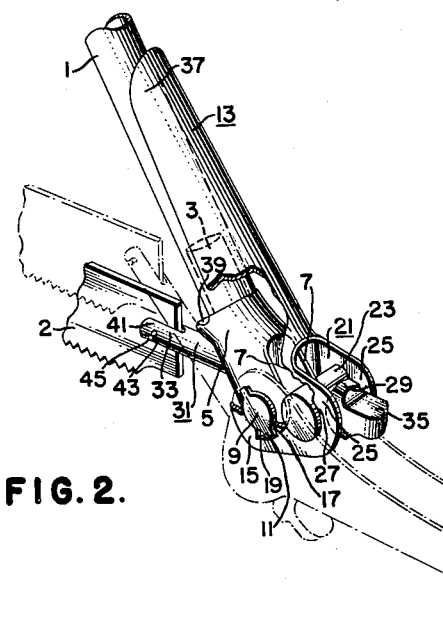
FIG.2.
INVENTOR
PER ARVID ANDREASSON
BY *McGlew and Toren*
ATTORNEYS Patented Oct. 30, 1962

3,060,983
STRETCH DEVICES
Per Arvid Andreasson, Orsa, Sweden, assignor to Järnbirger Aktiebolag, Orsa, Sweden, a company of Sweden
Filed June 1, 1961, Ser. No. 115,071
Claims priority, application Sweden June 1, 1960
6 Claims. (Cl. 145—33)

This invention relates to stretch devices for securing an element in a holder, and more particularly such devices for securing a bow saw blade in a saw bow. A stretch device of this type usually comprises a double-armed stretch lever which is swingably pivoted about pins in a fork shaped end of a holder and in its outer end has a securing pin for the saw blade or the like to be stretched, which is so positioned relative to the pivot axis of the lever that when the other end of the stretch lever is swung towards the holder the securing pin is swung to such a position that the stretch pin secured therein will arrive in a locking position relative to the pivot axis. The various members of such a stretch device have hitherto been assembled by rivets or screws. Therefore it has been very complicated or impossible to dismantle the members. Usually this has not caused any inconvenience when the stretch device is made of steel or another metal, but if it is desired to use plastics rivet and thread joints will cause considerable disadvantages.

It is one object of the invention to obtain a stretch device of said type which is free from rivet and thread joints but the parts of which nevertheless are satisfactorily assembled. It is also an object of the invention that the various parts of the device shall be easily dismantled and again fitted together.

In order to reach these objects and obtain other advantages the stretch device according to the invention is built up in the following way. Assuming the element shall be kept under tension in a given stretch direction between two securing members in the holder, such as a saw bow, one of said securing members comprises a stretch pin to be fitted with its inner end to said element, such as a saw blade, longitudinally to said stretch direction and with its outer end at the extreme end of a stretch lever. At an intermediate position said stretch lever is swingably fitted on coaxial pivot pins on the outer sides of pivot pin ears projecting from said holder at each side of said stretch pin as fitted. The double-armed stretch lever has a handle end and a securing end including the extreme end referred to above. The securing end comprises two parallelly projecting lever flaps having coaxial openings adapted to be fitted rotatably upon said pivot pins. A lever ear projects from each of said lever flaps oppositely to said handle and the securing pin referred to above is fitted in holes in said lever ears. This pin has a transversal hole in the portion thereof situated between the lever ears and the stretch pin, having at its outer end a head of larger diameter than the rest of the pin, and is fitted in the transversal hole movably up to said head which forms a shoulder and a stop. It is understood that the stretch lever, with the securing pin and stretch pin fitted therein, is swingable about the pivot pins from an extreme stretched position in which the handle portion of the lever is moved against the holder so that the assembly of the element to be stretched and the stretch pin is brought under tension. In this position the stretch pin is located between the axis of said pivot pins and the body of the holder. On the other hand the lever can be swung from this extreme stretched position to an extreme loosened position in which said assembly is slackened and the stretch pin engages an abutment on the holder. In an advanced embodiment of the invention the pivot pin has a nose extending radially over the plane of the outside surface of said flap beyond the periphery of said pin which cooperates with a recess in the flap situated so as to permit coincidence with the nose only in a position where the stretch pin is removed, which will be explained more in detail hereinbelow.

The invention will now be described more in detail with reference to the attached drawing which is presented for the purpose of illustration and not for limiting the scope of the invention.

In the drawing:

FIG. 1 illustrates a bow saw with a stretch device according to the invention and a saw blade fitted therein, and FIG. 2 illustrates the stretch device in somewhat larger scale and partially in section.

In the embodiment illustrated the bow consists of a bent metal pipe 1 in the securing end of which there is a holder 3 inserted in the pipe 1 and having an outer portion 5 from which two pivot ears project to form a forklike member. A pivot pin 9 is secured at the outer side of each of the pivot ears. The pins are provided with radially projecting noses 11 the function of which shall be described more in detail hereinbelow. About the pins 9 the double-armed stretch lever 13 is swingably pivoted with its somewhat resilient, parallelly extending flaps 15 which are provided with holes 17 for the pins 9. In the material of the flaps there are in a given peripheral position annexed to the holes 17 recesses 19 for the noses 11. The one arm of the stretch lever 13 forms a handle 37 and extending oppositely to the handle two stretch lever ears 25 project from the flaps 15. The flaps and ears form a securing end 21 of the lever. A securing pin 23 is journalled in holes 27 in the ears 25. The pin 23 has a transversal hole (not seen in the drawing) through which the stretch pin 31 passes. The stretch pin 31 is secured to the saw blade 2 with its inner end 33 having a slot 41 and a transversal hole 43 coinciding with a corresponding hole in the saw blade to which the stretch pin is secured by means of a small pin 45. At its outer end 35 the stretch pin 31 has a head 29 forming a stop shoulder engaging the securing pin 23 when the lever 13 is swung with the handle 37 against the holder 3 or the tube 1 to stretch the blade 2. The head 29 also serves to limit the axial movement of the securing pin 23. The width of the head 29 is preferably substantially equal to the distance between the ears 25. Thereby the pin 23 is fixed to the lever 13 without rivet or screws.

The securing pin 23 is so situated relative to the swing axis of the lever 13, i.e. the pins 9, that when the handle 37 is swung against the holder 3 or the bow tube 1 pin 23 is swung to such a position that the stretch pin 31 arrives in locking position relative to the swing axis, which means that the pin 31 then comes in the interspace between the pivot ears 7 between the axis of pins 9 and holder 3.

As illustrated in the drawing the stretch lever 13 is in its extreme stretched position. By turning the handle 37 from the holder 3 about the pins 9 the assembly of saw blade 2 and stretch pin 31 will be slackened and the lever can be turned until stretch pin 31 engages the abutment 39 on the holder. The lever 13 is then in its extreme loosened position, which is illustrated in FIG. 2 by hatch-dotted lines, and abuts end 35.

The noses 11 on the pins 9 and the recesses 19 in the flaps 15 are so situated relative to each other that the noses will coincide with the recesses only in case the stretch pin 31 is removed sufficiently from its fitted position so as to permit lever 13 to be swung further than to the extreme loosened position defined by the engagement of pin 31 with abutment 39. The noses 11 will thus engage the material of the flap 15 in all positions of lever 13 from its extreme stretched to its extreme loosened position and thus prevent the flaps from being bent out. By this arrangement the stretched lever is safely fixed to the holder 3 as long as the saw is under normal use and as long as a saw blade is secured to the pin 31 but the lever can easily be removed from the holder by removal of the pin 31 when the lever can be turned until the noses 11 coincide with the recesses 19 and the flaps 15 be bent out and the lever 13 be removed.

The stretch pin 31 as illustrated has a circular cross section and the transversal hole in pin 23 is also preferably circular. In order to keep the saw blade in fixed position the pin 31 should be prevented from being rotated in the hole of pin 23. This can be realized in different ways. The cross section of the pin 31 at the portion housed in pin 23 in the fitted position of these elements may be different from the circular shape and, of course, the transversal hole in pin 23 should be correspondingly shaped. Alternatively the head 29 and the surface of pin 23 engaged by head 29 may have co-operting projections and recesses so that pin 31 and pin 23 become fixed to each other with regard to rotatability when the assembly is in stretched position. According to a further alternative head 29 may have plane sides engaging the ears 25 so as to prevent rotation. The cross section of pin 31 and the shape of the hole in pin 23, the arrangement of the recesses and projections of head 29 and pin 23, and the plane surfaces of head 29, respectively, may evidently be shaped and positioned so that the pin 31 can be secured to pin 23 in different fixed rotary positions so that the saw blade 2 can be fixed in the saw bow 1 in different angular positions.

It will be understood from the foregoing description that the various members from which the stretch device necessarily must be built up are mounted in a completely satisfactory manner without using rivets that cannot be opened or thread joints that are unsafe and inconvenient.

In the embodiment described the flaps 15 of the stretch lever 13 are mounted upon outer pins 9 from the outside of the pivot ears 7 but it will be easily understood that by slightly modifying the shape of the securing end 21 of the lever the flaps 15 can be attached to pins on the inner side of ears 7. If in this case the ears 7 are rigid and the flaps 15 flexible and pin 31 sufficiently thick the pin 31 will in its fitted position prevent flaps 15 from escaping from the pivot pins without using noses and recesses as in case the flaps are mounted from outside.

Although the invention in the first hand relates to securing bow saw blades in a saw bow the stretch device according to the invention can be used in other connections where an element is to be fixed under tension in a holder.

I claim:

1. Stretch device for securing in a holder, such as a saw bow, an element, such as a bow saw blade, under tension in a given stretch direction between two securing members in said holder, in which one of said securing members comprises a stretch pin to be fitted with its inner end to said element longitudinally to said stretch direction, one pivot pin ear projection from said holder at each side of said stretch pin as fitted, coaxial pivot pins on said ears, of double-armed stretch lever having a handle end and a securing end, said securing end comprising two parallelly projecting lever flaps having coaxial openings adapted to coincide with said pivot pins, said lever being swingably pivoted with said openings about said pivot pins, a lever ear projecting from each of said lever flaps oppositly to said handle, coaxial holes in said lever ears, a securing pin fitted in said holes in said lever ears and having a transversal hole in the portion thereof situated between said lever ears, said stretch pin having at its outer end a head of larger diameter than the pin, the stretch pin being fitted in said transversal hole movably up to said head which forms a stop, an abutment on said holder, said stretch lever, with the securing pin and stretch pin fitted therein, being swingable about said pivot pins from an extreme stretched position, in which the assembly of said element and stretch pin is under tension and the stretch pin is located between the axis of said pivot pins and the body of the holder, to an extreme loosened position in which said assembly is slackened and the stretch pin engages said abutment.

2. Stretch device as claimed in claim 1, in which at least one of said lever flaps and pivot pin ears is moderately flexible so as to make feasible the mounting of said flaps on to said pivot pins.

3. Stretch device as claimed in claim 2, in which said pivot pins extend laterally from the outer sides of said pivot pin ears.

4. Stretch device as claimed in claim 3, in which each of said pivot pins has a nose extending radially over the plane of the outside surface of said flap beyond the periphery of said pin, said flap has a recess annexed to the opening therein shaped so as to coincide with said nose in one rotary dismantling position of said flap relative to said pivot pin, said nose preventing in other relative positions said flap from being removed from said pin.

5. Stretch device as claimed in claim 4, in which said recess in the flap is located at such a position of the periphery of the opening in the flap that said nose of the pivot pin does not coincide with the recess in any relative rotary position of said stretch lever flap and said pivot pin between said extreme stretched and extreme loosened positions.

6. Stretch device as claimed in claim 1, in which said head of the stretch pin is substantially as wide as the distance between said lever ears.

References Cited in the file of this patent

UNITED STATES PATENTS

| | | |
|---|---|---|
| 1,558,315 | Timander | Oct. 20, 1925 |
| 1,569,407 | Spartwento | Jan. 12, 1926 |